United States Patent [19]
Cane et al.

[11] Patent Number: 5,935,659
[45] Date of Patent: Aug. 10, 1999

[54] PROCESS AND APPARATUS FOR THE ROLLER-APPLICATION OF AN AQUEOUS THIXOTROPIC COATING COMPOSITION

[75] Inventors: Michael Roger Cane, Cambridge; Iain Grierson McDerment, Royston; David Elliott, Marlow, all of United Kingdom

[73] Assignees: Imperial Chemical Industries PLC, London, United Kingdom; Black & Decker Inc., Newark, Del.

[21] Appl. No.: 09/101,495

[22] PCT Filed: Dec. 24, 1996

[86] PCT No.: PCT/EP96/05835

§ 371 Date: Nov. 6, 1998

§ 102(e) Date: Nov. 6, 1998

[87] PCT Pub. No.: WO97/25156

PCT Pub. Date: Jul. 17, 1997

[30] Foreign Application Priority Data

Jan. 11, 1996 [GB] United Kingdom .................... 9600560
Sep. 7, 1996 [GB] United Kingdom .................... 9618715
Sep. 9, 1996 [GB] United Kingdom .................... 9618787

[51] Int. Cl.$^6$ .............................. B05C 1/28; B65D 35/28
[52] U.S. Cl. ..................... 427/428; 427/429; 401/188 R; 222/95
[58] Field of Search ............................... 401/188 R, 187; 222/95, 103, 105; 427/428, 429

[56] References Cited

U.S. PATENT DOCUMENTS

| | | | |
|---|---|---|---|
| 4,003,870 | 1/1977 | Gibson et al. | 260/29 RW |
| 4,247,339 | 1/1981 | Bolton et al. | 106/308 B |
| 4,386,717 | 6/1983 | Koob | 222/94 |
| 5,150,820 | 9/1992 | McGill | 222/95 |
| 5,169,037 | 12/1992 | Davies et al. | 222/402.1 |
| 5,395,436 | 3/1995 | Setzke | 106/34 |

FOREIGN PATENT DOCUMENTS

| | | |
|---|---|---|
| 377 195 | 7/1990 | European Pat. Off. . |
| 80 00315 | 3/1980 | WIPO . |
| 2 142 386 | 1/1985 | WIPO . |

*Primary Examiner*—Katherine A. Bareford
*Attorney, Agent, or Firm*—Pillsbury Madison & Sutro, LLP

[57] ABSTRACT

A process and apparatus for the application of aqueous paints. The paint is supplied in a flexible container compressible by an adjacent inflatable bag. Paint travels from the container via a long delivery tube to a brush, roller or pad applicator. The container is compressed horizontally by means of a foldable base when compressed by the inflatable bag. The length of the tube is 1 to 3 m, and the inner diameter of the tube is 5 to 15 mm, to provide a steady delivery of paint to the applicator.

8 Claims, 5 Drawing Sheets

PROCESS AND APPARATUS FOR THE ROLLER-APPLICATION OF AN AQUEOUS THIXOTROPIC COATING COMPOSITION

This application is the national phase of international application PCT/EP96/05835 filed Dec. 24, 1996 which designated the U.S.

BACKGROUND OF THE INVENTION

This invention relates to a process for the roller-application of an aqueous thixotropic coating composition to a surface at ambient temperatures, say 5 to 35° C. The invention also relates to a combination for use in the process. The process and combination are most suitable for use with coating compositions such as paints, distempers, varnishes or woodstains which are conventionally applied to surfaces found on buildings. The process and combination are both easy to use by unskilled amateur or "Do-it-Yourself" (i.e. "DIY") painters, in that they substantially reduce and usually, almost eliminate mess from rollers, provided that they are used with a reasonable degree of common sense. The process and combination also reduce the amount of physical effort involved in painting, so making it a less tiring activity, especially for unskilled amateurs.

Roller-mess can occur in three ways. Firstly, the painter may load too much paint onto the roller so that it drips as it is being taken from a container of paint to the surface to be painted. Secondly, because rollers rotate during the application of the paint to a surface, blobs of overloaded paint are caused to fly off the roller by the centrifugal force they experience. This is known as "fly-off" in the British trade. Thirdly, probably all aqueous paints used in painting buildings at ambient temperatures contain cellulosic or similarly elastic thickeners. Such thickeners cause the paint to break up into droplets in the space just behind the roller causing a fine spray of paint known as "roller-spatter". Roller-spatter is described by R H Fernando et al in the book "Polymers in Aqueous Media", edited by J E Glass and published by the American Chemical Society of Washington in 1989 (see pages 247 and 248 and especially the photograph on page 248).

An early attempt to minimise mess from contact-coating tools (for example rollers, brushes or pads) was disclosed by Berger, Jenson & Nicholson Limited in British Patent Specification GB 922 456 published in 1963. GB 922 456 discloses the addition of titanium chelates to aqueous paint formulations containing cellulose. The chelate creates a gel structure which inhibits dripping, yet which breaks down under the shear forces experienced during application of the paint to the surface, with the result that the production of smooth coatings is still possible. The use of titanium chelates was and still is a major commercial success in the field of brush-painting, but it has been found to aggravate the problem of fly-off during roller-painting. This is because the gelled structure enables even bigger blobs of paint to be picked up by a contact-coating tool, which means that even more paint is available to fly when the tool is one which rotates, i.e. a roller.

The next commercially successful development relating to mess-free painting related specifically to roller-painting and it was disclosed by one of the present Applicants in their European Patent Specification EP 0 144 135A published in 1985. EP 0 144 135A disclosed the addition of large amounts of titanium chelate (or equivalents such as zirconium chelate or gel-forming clays) to aqueous paint formulations containing cellulosic thickeners, so producing a paint so highly gelled that it was virtually solid. The solid paint was formed in a tray dimensioned so as to be able to receive a roller of standard size and the roller was loaded by pressing it against the surface of the paint and rolling it back and forth. Such rolling liquefies the top two or three millimeters of the surface of the paint, but only the top two or three millimeters so that the paint is taken up onto the roller in a very regulated way, which significantly reduces the risk of blob-formation. In addition, roller spatter is virtually eliminated possibly because the highly regulated loading ensures a very uniform and light loading of paint, which is then less able to execute extensive elastic deformations.

The concept of a solid paint in a roller-tray was and is a major commercial success in the field of roller-painting in Britain and Germany. However, it has three disadvantages. Firstly, formation of a gel which is virtually solid takes a long time, so the paint has to be stored in its trays for about 4 weeks and this is expensive in terms of warehouse space. Secondly, each tray of paint is heavy and unwieldy to handle, especially when a painter is up a ladder, as when painting a ceiling for example. Thirdly, as paint is applied to the surface being painted, the roller has to be repeatedly returned to the tray for re-loading with a further supply of paint. Re-loading is tiring because it involves pressing the roller against the solid paint and it is time-consuming because several traverses of the roller across the paint surface have to be made. Clearly what is needed is a technique for transferring highly structured paint from a supply container to a roller in a way which is essentially non-tiring, non-time-consuming but highly regulated.

The paint trade has spent most of this century looking for a commercially acceptable way to load rollers or brushes with paint delivered under pressure during painting, so as to avoid the interruptions and fatigue caused by re-loading. For example, as long ago as 1913, United States Patent Specification U.S. Pat. No. 1,065,610 described a "fountain" paint brush incorporating a channel through which paint under pressure could be delivered and loaded onto the bristles of the brush. Similar systems were still being proposed in 1968 (see Belgian Patent Specification BE 672 437), in 1976 (see United States Patent Specification U.S. Pat. No. 3,960,294), in 1980 (See World Patent Specification WO 80/00315), in 1985 (see British Patent Specification GB 2 142 386A) in 1986 (see French Patent Specification FR 2 575 909) and in 1993 (see United States Patent Specification U.S. Pat. No. 5,246,302). So far, no system of this type has achieved significant commercial success, despite the long sustained world-wide interest in trying to solve the problem. For example, a system based on the disclosure of WO 80/00315 was launched commercially in the early 1980's, but a lack of commercial success forced its withdrawal from the market less than two years later.

A recent confidential study of the above failures has led to a new insight into what the systems lacked at least in the eyes of unskilled amateur (i.e. Do-it-Yourself) painters. To succeed, a system must be simple, reasonably inexpensive to manufacture and it must be non-tiring and lightweight so that it can be easily carried (for example on a shoulder strap) during painting by an unskilled (often female) amateur painter. It must be able to deliver pressurised paint at the touch of an easily accessible button or lever and without the need for interruption of the painting operation. The system must also be able to accommodate different paints of alternative colours and/or sheens (i.e. matt, silk or gloss sheens) without the need to clean a paint reservoir. Above all for roller-painting by amateurs, commercial experience with solid paints has shown that avoidance of fly-off and roller-spatter are extremely important advantages relative to more conventional roller-painting systems. In practical terms, this means that the roller must be loaded in a very regulated way which in turn means that the system must be able to deliver paint to the roller in a very steady flow.

The system which is described in principle in WO 80/00315 employed paint provided in a rigid container/reservoir adapted to receive a rupturable capsule of liquefied carbon dioxide. Such a system presents several problems. Firstly, the paint was pressurised by rupturing the capsule to create a high super-atmospheric pressure of carbon dioxide *within the reservoir. Amateur painters have an instinctive fear of such capsules and high super-atmospheric pressures. Secondly, to avoid wasting the carbon dioxide, the container/reservoir had to be capable of making a sustainable efficient gas-tight seal with the rest of the system. In order to guarantee a seal of this quality, the containers had to be quite robust and had to be moulded very accurately under very clean conditions and this added to their weight and cost. Thirdly, the carbon dioxide pressure decreases during use and so likewise the rate at which the paint is forced along the tube from the reservoir to the roller also decreases. This means that a constant rate of loading of the roller cannot be achieved, nor can the change in the rheological properties of the paint due to loading be kept constant.

Alternative pressurising techniques comprising the exertion of super-atmospheric air-pressure on paint contained in a flexible container are disclosed in U.S. Pat. No. 3,960,294 (published in 1976), in GB 2 142 386A (published in 1985) and in U.S. Pat. No. 5,246,302 (published in 1993). None of these publications discloses the importance of creating a steady pressure, so that the change in the rheological structure of the paint as it is forced through a long delivery tube is likewise steady.

Confidential consumer research has shown that, for the system to be attractive to the unskilled amateur painter, it must offer not only non-tiring relatively mess-free roller-painting using paint delivered under pressure, but also the system must a) be almost as mess-free as roller-painting using solid paint, b) employ only slightly superatmospheric pressure, c) employ a light-weight air-compressor powered by a small cheap electric battery and d) accommodate a delivery tube about 1.3 to 2.3 m long, which can comfortably lead from a flexible bag of paint either supported on the floor or carried by the painter at her waist or on her back.

It has now been discovered that these requirements can be met by a combination of a) the supply of appropriate paint in a container biased to horizontal compression during use and preferably provided with an internal channel-defining spacer, b) the compression of the paint container in a horizontal direction preferably accompanied by a downwards force and c) the choice of the correct range of internal diameters for the long delivery tube.

More specifically, it has been found that a reliably steady delivery of appropriate paint to the roller can be achieved using an air pressure of only 1.8 to 2.3 bar which is easily obtained using an air compressor powered by no more than a 3.5 volt electric battery of 0.7 to 2 amp hour size and which can be sustained for up to 10 hours.

SUMMARY OF THE INVENTION

Accordingly this invention provides a process for the roller-application of an aqueous thixotropic coating composition to a surface at ambient temperatures wherein the process includes a) supplying the coating composition in a flexible container having an outlet, b) compressing the container by means of air pressure to expel the coating composition from the container via the outlet, c) transferring the expelled composition via a delivery tube 1 to 3 m long onto a roller and d) transferring the composition from the roller onto the surface characterised in that the process also includes e) biasing the container to be compressible in a horizontal direction during use by the provision of opposed flexible walls spaced apart by a flexible transverse base having a flexible crease which extends between the walls, f) using an air-pressure of from 1.8 to 2.3 bar absolute to inflate a flexible bag and urge it horizontally against one of the opposed walls of the container to cause the compression which expels the coating composition and g) subjecting the coating composition to the effects of passage through a 1 to 3 m long tube of internal diameter 5 to 15 mm.

Preferably, the horizontal compression of the container is accompanied by a downwards force on the container. Also it is preferred that a permanent channel leading to the outlet is defined within the container so as to ensure expulsion of the composition remains possible even when the compression of the container brings its opposed walls very close together.

The invention also provides a combination for use in performing the process wherein the combination includes a) a housing for parts of the combination, the housing including opposed walls, b) coating composition supplied in a flexible container having an outlet and located within the housing, c) means for compressing the container by use of air pressure so as to expel coating composition from the container via the outlet and d) a delivery tube 1 to 3 m long, one end of which communicates with the outlet from the container and the other end of which is connectable to a roller adapted to receive a delivery of the composition under pressure characterised in that e) the container includes
   I) opposed flexible walls
   ii) a flexible base which extends transversely of the walls and
   iii) a flexible crease formed in the base which crease extends between the opposed walls and biases the container towards a horizontal compression when in use, f) the means for compressing the container includes a flexible inflatable bag located adjacent one of the opposable walls of the container and adjacent one of the walls of the housing whereby expansion of the bag by an air-pressure of from 1.8 to 2.3 bar urges the bag against the walls to cause horizontal compression of the container and g) the delivery tube has an internal diameter of 5 to 15 mm. The above described process and combination can also be used in applying coating using a brush or a pad, rather than a roller applicator.

Preferably the opposed walls of the container curve inwardly as they extend away from the base so as to permit the inflating bag to exert a downwards force on the container. It is also preferred that the container be provided with an internal channel-defining spacer having a proximal end connected to the outlet and a distal end inside the container and at least one means (and preferably 2 to 7) for allowing the coating composition to enter the channel defined by the spacer. The channel ensures that expulsion of coating composition remains possible even when compression of the container brings its opposed walls close together. The channel can be permanent. The construction of the flexible container has been found to facilitate the operation of the process especially as it is biased to favour compression in a predominantly horizontal plane during painting. This is achieved by means of the two opposed walls spaced apart by the transverse base containing a crease which facilitates inwards folding of the base allowing the opposed walls to be compressed towards each other.

In use, the base is preferably also used to enable the container to stand upright when filled with coating composition and the opposed flexible walls will extend essentially upwards and usually inwards from the base with the outlet being located in the uppermost regions of the container. Transverse compression exerted near to a transverse base also meets a degree of hindrance from the base which is sufficient to ensure that the compression will tend to bring the walls into sealing contact first along some line in the upper regions of the container. A sealing contact of the opposed walls in the upper regions of the container would trap paint in a compartment in the lower regions of the container and would isolate it from the outlet were it not for the channel-defining spacer with access to the defined channel at its distal end. For this reason, the distal end is preferably positioned as close as reasonably practical to the base of the container.

Use of a channel-defining member overcomes the problem of compartmentalisation of the container during transverse compression, but use of a channel-defining member which is open only at its ends (such as the tube employed in GB 2 142 386A) would prevent dispensing of the coating composition by simple pouring from the container except when the container is very full. It is important to be able to pour paint from the bag (after detaching it from the delivery tube), because it has been discovered that unskilled amateurs expect to miss patches of surface when roller-paint large areas such as walls or ceilings. Therefore, they need to feel the assurance of being able to paint the missed patches using a simple brush-painting technique involving dipping the brush in the usual way into small quantities of paint poured into a small can from the flexible bag, usually towards the end of the painting operation. Therefore it is an important preference to have access to the channel near to the outlet.

Compression of the container involves use of the inflatable bag which is sandwiched between one wall of the container and one wall of the housing. Inflation of the bag by means of a small battery-operated compressor carried by the housing causes the bag to expand and to react against the wall of the housing whereupon an opposite portion of the bag is urged against the container and imparts an essentially horizontal compression. If the walls of the container curve inwardly, the bag will also impart a downwards force on the container which may have a beneficial effect on the steadiness of the expulsion from the container.

The flexibility inherent in an inflatable bag allows the bag to conform to the shape of the container during its compression which is both useful in achieving a steady expulsion and also in supporting the container against bursting forces. A simple flexible bag may be used, but a bellows construction is more efficient. A suitable bellows may comprise two or more bags joined together with a communicating aperture between them.

The flexible walls of the container and bag are conveniently made from plastics films. Preferably a thermoplastic such as polyethylene terephthalate or a polyamide such as nylon 66 is used to provide strength and it may be laminated with lower melting thermoplastic such as low density polyethylene, ethylene vinyl acetate co-polymer or polyethylene isophthalate to provide heat sealability.

The outlet will usually be injection moulded from a thermoplastics material which bonds well to the heat sealable part of the flexible container walls. High density polyethylene is the most preferred choice. Pouring from the container when detached from the combination is more convenient if the outlet is located on a chamfer extending from preferably 30° to 60° to the horizontal when the container is standing upright.

Preferably the housing should be capable of being carried by the painter either by use of shoulder straps or by attachment at her waist. For example, the container and bag may be accommodated as a snug fit in a lidded thermoplastics box whilst the compressor can be mounted on or in the box. The outlet from the container may be located in a seating in the box. Suitable housings, pumps and gasketting for the system are described in a further British Patent Application filed GB 96 18715.8 by the same joint Applicants and having the title "Paint System".

This further Application also describes a particularly secure connector for use in connecting the outlet from the flexible container to the delivery tube.

Appropriate coating compositions for use in this invention have viscosities and thixotropics at least in part created by a combination of hydrophobic moieties provided by an associative thickener and cellulosic moieties provided by a thickener selected from the group consisting of simple cellulosic thickeners, cellulosic associative thickeners and a combination of the to. Preferably at 25° C., the coating composition has a combination of, viscosity, characteristics comprising:

i) a fixed shear-rate viscosity of from 0.06 to 0.25 pa.sec (0.6 to 2.5 poise) when measured at a shear-rate of 10,000/sec, ii) a fixed shear-stress viscosity of from 0.8 to 3.0 pa.sec (8 to 30 poise) when measured at a shear stress of 120 Pascal (1,200 dyne/cm$^2$) and iii) a Rotothinner mid-shear viscosity of from 0.5 to 5.0 pa.sec (5 to 50 poise), The hydrophobic moieties may be provided by non-cellulosic associative thickeners or by cellulosic associative thickeners. Both types of associative thickener are widely used in aqueous paints and they are described in the third edition of the book "Introduction to Paint Chemistry" by G P A Turner published by Chapman and Hall of London in 1988 (see page 130). Associative thickeners contain water-dispersible portions and also hydrophobic portions. The water-dispersible portions ensure that the thickener can be dispersed in an aqueous paint formulation whilst the hydrophobic portions are capable of adsorbing onto dispersed particles of film-forming polymers (including copolymers) present in the paint. Adsorption onto pigment and extender particles may also occur as may mutual adsorptions between hydrophobic groups within the thickener itself. Such adsorptions occurring in the vicinity of the cellulosic thickening create a unique type of thixotropy and viscosity which gives minimal roller-spatter even after the paint has experienced high shear-stress in the delivery tube which severely modifies the rheology of the paint.

The most common non-cellulosic associative thickeners are either polyethylene oxide/polyurethane block copolymers or anionic alkali-soluble acrylic or methacrylic polymers or copolymers modified by the presence of hydrophobic moiety. Preferably the coating composition will contain from 1 to 7 wt % of the associative thickener.

Simple cellulosic thickeners or similarly elastic thickeners are also widely used in aqueous paints. They comprise celluloses having a weight average molecular weight of at least 20,000 and preferably over 100,000 but which have been modified to make them dispersible in water. They are often described as "water-soluble", even though their high molecular weight means that they presumably do not form true solutions.

Modification usually involves introducing hydrophilic moieties into the cellulose ring structures. The most common modified cellulosic thickeners are hydroxyalkyl (preferably hydroxyethyl) celluloses, salts of carboxyalkyl celluloses (preferably a sodium salt of carboxy ethyl celluloses) or celluloses modified by the presence of amino groups. Preferably the coating composition will contain from 2 to 10 wt % of the simple cellulosic thickener.

Cellulosic associative thickeners are in essence "water-soluble" celluloses which have been additionally modified by the introduction of hydrophobic groups, so that they behave like non-cellulosic associative thickeners, but they also have thickening properties of the type derived from water-dispersible celluloses. They can therefore alone provide both the hydrophobic characteristics and the cellulosic characteristics needed for the purposes of this invention. Preferably the coating composition contains from 0.005 to 3 wt % of a cellulosic associative thickener.

An important step in the making of this invention was the discovery that there existed a profile of viscosity characteristics which enabled a paint to be pumped from a container by a light-weight and low pressure system and to be delivered onto a roller in a very regulatable way, despite having passed through a long 8–12 mm diameter tube at a flow rate of about 6 liters/hour. A correct fixed-shear rate viscosity ensures that the paint spreads correctly during roller-painting and for this system the fixed-shear rates selected are abnormally high relative to conventional paints. A correct fixed shear-stress viscosity ensures that the paint is pumpable through the delivery tube in a highly regulatable way. Fixed shear-stress viscosity is not a characteristic usually studied in relation to paints. A correct Rotothinner viscosity ensures that the paint can be pumped from a container whilst not dripping or splashing during loading of the roller or after roller-application, but before the paint has begun to dry significantly.

The selected viscosity characteristics lead to greatly reduced spatter and fly-off without the need to use high concentrations of titanium or zirconium chelates or structuring clays which require lengthy storage of the paint. However, if the fixed shear-stress viscosity of the paint is in the range of 0.8 to 1.5 pa.sec, useful improvements in the control of the delivery of the paint to the roller can be achieved with concentrations of up to 0.3 (preferably 0.1) wt % of the chelate or structuring clay. Moreover, such improvements can be obtained without the need for abnormally long periods of storage.

Suitable film-forming polymers for use in the coating compositions are the polymers and copolymers of vinyl esters, especially vinyl acetate or vinyl "Versatate" (Vinyl "Versatate" is the vinyl ester of so-called "Versatic" acid, which is a mixture of aliphatic monocarboxylic acids each containing an average of 9, 10 or 11 carbon atoms, and is commercially available from the Shell Chemical Company of Carrington, England), also alkyl (especially methyl, ethyl and n-butyl) esters of unsaturated carboxylic acids such as acrylic or methacrylic or fumaric or maleic acids, unsaturated carboxylic acids such as acrylic or methacrylic acids, unsaturated acid anhydrides such as maleic anhydride, monovinylidine aromatics especially styrene, vinyl toluene or vinyl pyridine, alkenes and halogenated alkenes such as ethylene, propylene, vinyl chloride, vinylidene chloride and tetrafluorethylene, unsaturated nitriles, dienes and (for use only in copolymerisations) minor amounts of hydroxyl or amino alkyl (especially ethyl) esters of unsaturated carboxylic acids such as acrylic or methacrylic acids, epoxy compounds such as glycidyl methacrylate and also sulphonate.

The coating compositions may additionally contain components conventionally used in making for example paints, varnishes or woodstains. Such components include pigments, dyes, extenders, thickeners, fungicides, anti-foam agents, surfactants, flow improvers and drying agents and solid hollow or vesiculated particles of insoluble organic polymeric material as disclosed in EP 0 425 085A or U.S. Pat. No. 5 264 482.

For the purposes of this invention, viscosities are measured at 25° C. using the following techniques:

Fixed Shear-Rate Viscosity

Fixed shear-rate viscosity is measured using the cone and plate technique described in ASTM Test D4287-87, but with conditions adapted to produce a shear rate of 10,000/sec. The cone has an angle of 0.5° and a radius of 7.5 mm.

Fixed Shear-Stress Viscosity

Fixed shear-stress viscosity is also measured using the cone and plate technique, but with a positively controlled torque applied to the cone followed by precise measurement of the speed of rotation of the cone produced by the applied torque. The cone angle and radius are 0.5° and 7.5 mm.

An increasing range of torques are applied to the cone and the speed of rotation against torque is plotted. At a torque well above 120 Pascal, the process is reversed by using a decreasing range of torques and the total result is a hysteresis graph. The graph is used to determine the speed of rotation and torque at a shear stress of 120 Pascal and these are used to calculate fixed shear-stress viscosity at 120 Pascal using the following equation:

$$\text{Viscosity} = k \frac{\text{Torque}}{\text{Speed of Rotation}}$$

where k is a constant dependant in a known way on the geometry of the cone and plate.

Rotothinner Mid-Shear Viscosity

Rotothinner mid-shear viscosity is measured using the Sheen/ICI Rotothinner (Electrical Model) described in the Sheen leaflet headed "Viscosity Sheen" published by Sheen Instruments Limited of Kingston on Themes, Surrey, England.

Where the paint under test contains a chelate or clay structuring agent, it is necessary to operate the rotating components for a period of 4 minutes before taking readings, in order to destroy any gel structure created by the chelate or clay.

The invention is further illustrated by the following Examples of paint formulations suitable for use in the process.

EXAMPLE 1

Mid-Sheen Paint

Associative and Cellulosic Associative Thickener Combination

Example 1 illustrates the preparation of a mid-sheen (i.e. partial matt) paint formulation using a combination of a non-cellulosic associative thickener and a cellulosic associative thickener.

The formulation was made using the ingredients shown in Table 1. The ingredients of Step 1 were added in sequence (i.e. one after the other) to a cylindrical container fitted with a stirrer rotating at a slow speed of 500 rpm. The stirrer speed was then increased to the high speed of 2,500 rpm and the ingredients of Step 2 were added in sequence with stirring being continued for a further 30 minutes. The stirred contents were then transferred to a paddle mixer and the paddle was rotated at 250 rpm. The Step 3 ingredients were added in sequence and stirring continued. Ten minutes later, the Step 4 ingredient was added and 30 minutes after that, the Step 5 ingredients were added in sequence followed by a final 30 minutes period of stirring at 250 rpm. The paint had a fixed shear-rate viscosity of 0.18 pa.sec, a fixed shear-stress viscosity of 1.4 pa.sec and a Rotothinner viscosity of 0.74 pa.sec.

The paint formulation was filled into a container as described with reference to the drawings and subsequently used in a roller-painting system of the type described with reference to the drawings, but described in more detail in the further Application. A vertical surface was roller-painted with essentially roller-spatter or fly-off which was essentially as that achieved by roller-painting according to EP 0 144 135A.

TABLE 1

| Step | Ingredient | Parts by Weight |
|---|---|---|
| 1 | Water | 13.0 |
|  | Organic Solvent | 5.5 |
|  | Antifoaming Agent | 0.2 |
|  | Surfactant | 2.0 |
|  |  | 20.7 |
| 2 | Chalk | 5.4 |
|  | Kaolin | 14.0 |
|  | Water | 1.9 |
|  | Rutile Titanium Dioxide | 24.3 |
|  |  | 45.6 |
| 3 | Hydrophobically modified "water-soluble" cellulose as a cellulosic associative thickener | 0.15 |
| 4 | Water | 5.65 |
| 5 | *Copolymer (see footnote) | 15.8 |
|  | Antifoaming Agent | 0.1 |
|  |  | 15.9 |
| 6 | Hollow organic opacifier ("Rhopaque") | 5.0 |
|  | Vesiculated organic opacifier ("Spindrift") | 2.5 |
|  |  | 7.5 |
| 7 | Acrylic non-cellulosic associative | 1.5 |

TABLE 1-continued

| Step | Ingredient | Parts by Weight |
|---|---|---|
|  | thickener | 3.0 |
|  | Water | 4.5 |
|  | Total | 100.00 |

*The copolymer consisted of 48 wt % methyl methacrylate, 49 wt % ethyl hexyl acrylate and 3 wt % acrylic acid.

EXAMPLE 2

Matt Paint

Associative Thickener and Simple Cellulosic Thickener Combination

Example 2 illustrates the preparation of a matt paint formulation using a combination of a non-cellulosic associative thickener and a simple cellulosic thickener and other ingredients as shown in Table 2. The procedure of Example 1 was followed except that Step 4 was omitted and the final period of stirring was reduced to 10 minutes and the formulation was allowed to stand for 24 hours to allow the zirconium chelate to impart a weak gel structure to the paint.

The paint was found to have a fixed shear rate viscosity of 0.12 pa.sec, a fixed shear-stress viscosity of 1.0 pa.sec and a Rotothinner viscosity of 0.7 pa.sec, provided that the viscosity measurements were made after the paint had been subjected to 4 minutes of pre-measurement rotation to destroy the gel created by the zirconium chelate. The paint was filled into a container and used in a roller-painting process as in Example 1 with similarly low roller-splatter and fly-off.

TABLE 2

| Step | Ingredient | Parts by Weight |
|---|---|---|
| 1 | Water | 40.9 |
|  | Organic Solvent | 2.8 |
|  | Antifoaming Agent | 0.2 |
|  | Surfactant | 1.4 |
|  |  | 45.3 |
| 2 | Chalk | 4.3 |
|  | Kaolin | 16.2 |
|  | Rutile Titanium Dioxide | 12.0 |
|  |  | 32.5 |
| 3 | "Water-soluble" sodium carboxymethyl cellulose | 0.4 |
| 4 | Omitted |  |
| 5 | Copolymer as used in Example 1 | 11.2 |
| 6 | Vesiculated organic opacifier ("Spindrift") | 9.4 |
| 7 | Acrylic non-cellulosic associative thickener | 0.9 |
|  | Zirconium chelate structuring agent | 0.3 |
|  |  | 1.2 |
|  | Total | 100.00 |

EXAMPLE 3

Mid-Sheen Paint

Cellulosic Associative Thickener used alone

Example 3 illustrates the preparation of a mid-sheen paint formulation using a cellulosic associative thickener alone but with the assistance of a light gel structure imparted by titanium chelate. All the ingredients are shown in Table 3 and the procedure followed was the same as that of Example 2 with viscosities again being measured after destruction of the gel structure. The paint had a fixed shear-rate viscosity of 0.14 pa.sec, a fixed shear-stress viscosity of 0.9 pa.sec and a Rotothinner viscosity of 0.6 pa.sec.

The paint was filled into a container and used in a roller painting process as in Example 1 with similarly low roller-spatter and fly-off.

TABLE 3

| Step | Ingredient | Parts by Weight |
|---|---|---|
| 1 | Water | 22.0 |
|  | Organic Solvent | 2.3 |
|  | Antifoaming Agent | 0.3 |
|  | Surfactant | 2.5 |
|  |  | 27.1 |
| 2 | Chalk | 10.0 |
|  | Kaolin | 1.2 |
|  | Rutile Titanium Dioxide | 20.2 |
|  |  | 31.4 |
| 3 | Hydrophobically modified "water-soluble" cellulose as a cellulosic associative thickener | 0.5 |
| 4 | Omitted |  |
| 5 | Copolymer of Example 1 as dispersion in) | 15.0 |
|  | Water) | 19.2 |
| 6 | Hollow organic opacifier ("Rhopaque") | 5.9 |
|  | Pigment mixture | 0.7 |
|  |  | 6.6 |
| 7 | Titanium chelate structuring agent | 0.2 |
|  | Total | 100.00 |

BRIEF DESCRIPTION OF THE DRAWINGS

A preferred embodiment of the combination of mechanical features of the invention will now be described with reference to the drawings of which

FIG. 1a is a detail from FIG. 1 showing gasket 21 and the seating of the outlet in a side-wall of a box.

DETAILED DESCRIPTION OF THE INVENTION

Figure 1:
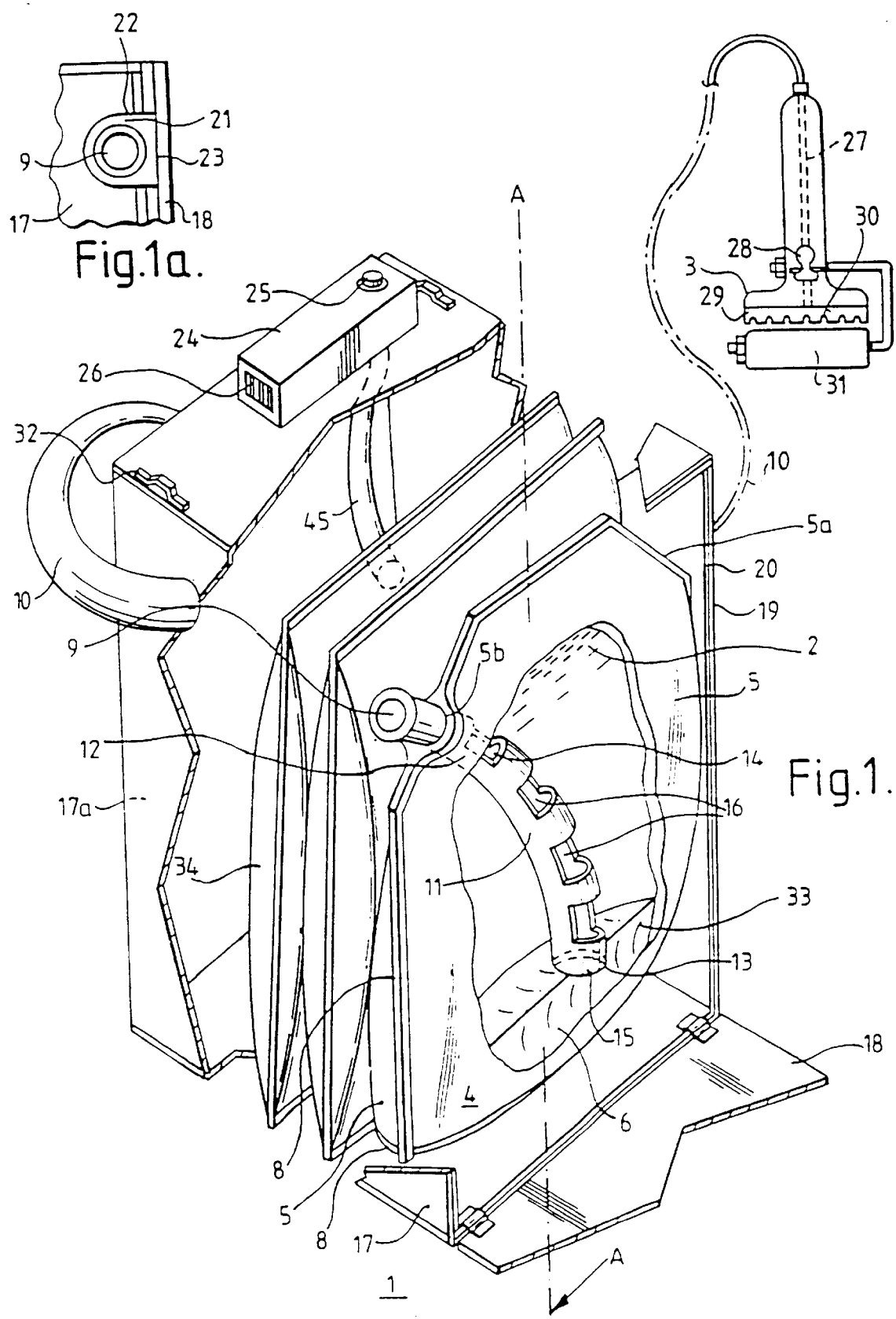
FIG. 1 is a partially exploded perspective view of a combination according to this invention but with gasket 21 (see Figure 1a) omitted and some parts broken away for clarity.

FIG. 1 shows a combination 1 for applying paint 2 to a surface using a roller 3 without the need to re-dip the roller 3 into paint 2. Combination 1 includes a collapsible container 4 comprising opposed flexible walls 5 rising from a base 6 formed by a transverse flexible wall having a crease 7 intermediate and mid-way between flexible walls 5. Base 6 both facilitates compression of the container in a steady manner and also enables container 4 to stand upright by spacing apart walls 5 when container 4 is filled with paint 2. Flexible walls 5 and base 6 are composed of a thermoplastics film consisting of a foil of polyethylene terephthalate laminated with a foil of low density polyethylene. Walls 5 and base 6 are welded together by heat sealed margins 8.

Container 4 is provided with an outlet 9 injection moulded from high density polyethylene, welded into a circular hole 5b formed in a 45° chamfered portion 5a of walls 5 and connectable to roller 3 by delivery tube 10 of diameter 10 mm. For clarity, tube 10 is shown disconnected from outlet 9. A channel-defining spacer 11 is moulded integrally with and makes a communicating connection with outlet 9 at its proximal end 12 and extends down into container 4 so that its open distal end 13 is close to base 6.

Proximal end 12 and distal end 13 have openings 14 and 15 (see especially FIG. 7) respectively which provide access for paint 2 to the channel defined by spacer 11 as it spaces apart walls 5 during collapsing of bag 4. Intermediate openings 16 are provided between ends 12 and 13 and are useful when the container is at various stages of emptying.

Container 4 is snugly accommodated inside lidded polypropylene box 17 having opposed wall 17a and which is shown with its hinged lid 18 open. On closing, lid 18 provides a wall opposed to wall 17a. Lid-receiving edges 19 of box 17 are provided with gaskets 20. Outlet 9 is provided with an encircling gasket 21 (shown in FIG. 1a but omitted from FIG. 1 for clarity) which is shaped so as to make a press-fit into semi-circularly ended seating slot 22 formed in box 17 and also to have edge 23 which lies flush with gaskets 20 when gasket 21 is firmly press-fitted into seating slot 22.

Box 17 also contains inflatable bellows-like double bag 43 containing inter-communicating aperture 44 (see FIG. 2) and air-line 45 which connects bag 43 to a compressor (not shown) located in casing 24.

The compressor is powered by a 3.6 v battery of 1.2 milliamp.hour capacity provided within casing 24 and on actuation by pressing push-button switch 25, the compressor draws in air via grid 26 and pumps it into bag 43 causing it to inflate and exert a transverse horizontal compression on inner flexible wall 5. It has been found that the battery is powerful enough to pressurise paint 2 sufficiently to deliver it along tube 10 into internal passage 27 of roller 3 at a rate of 6 liters/hour. Passage 27 is controlled by a push-lever operable valve 28 described more fully in GB 2 142 386A. On opening valve 28, paint 2 flows on into plenum 29 and out through holes 30 at a highly regulated rate and loads onto cylindrical surface 31 of roller 3 from which it can be transferred to a surface to be coated.

An important advantage of system 1 is that the flow of paint 2 to roller surface 31 can be easily controlled by a painter using the index finger of her painting hand to open valve 28 and the pressure of paint 2 is easily controlled by operation of push-button 25 using her free hand especially if box 17 is carried by means of shoulder straps passing through brackets 32. Therefore both control of paint flow and paint pressure become possible without the need to interrupt the painting operation.

Figure 2:
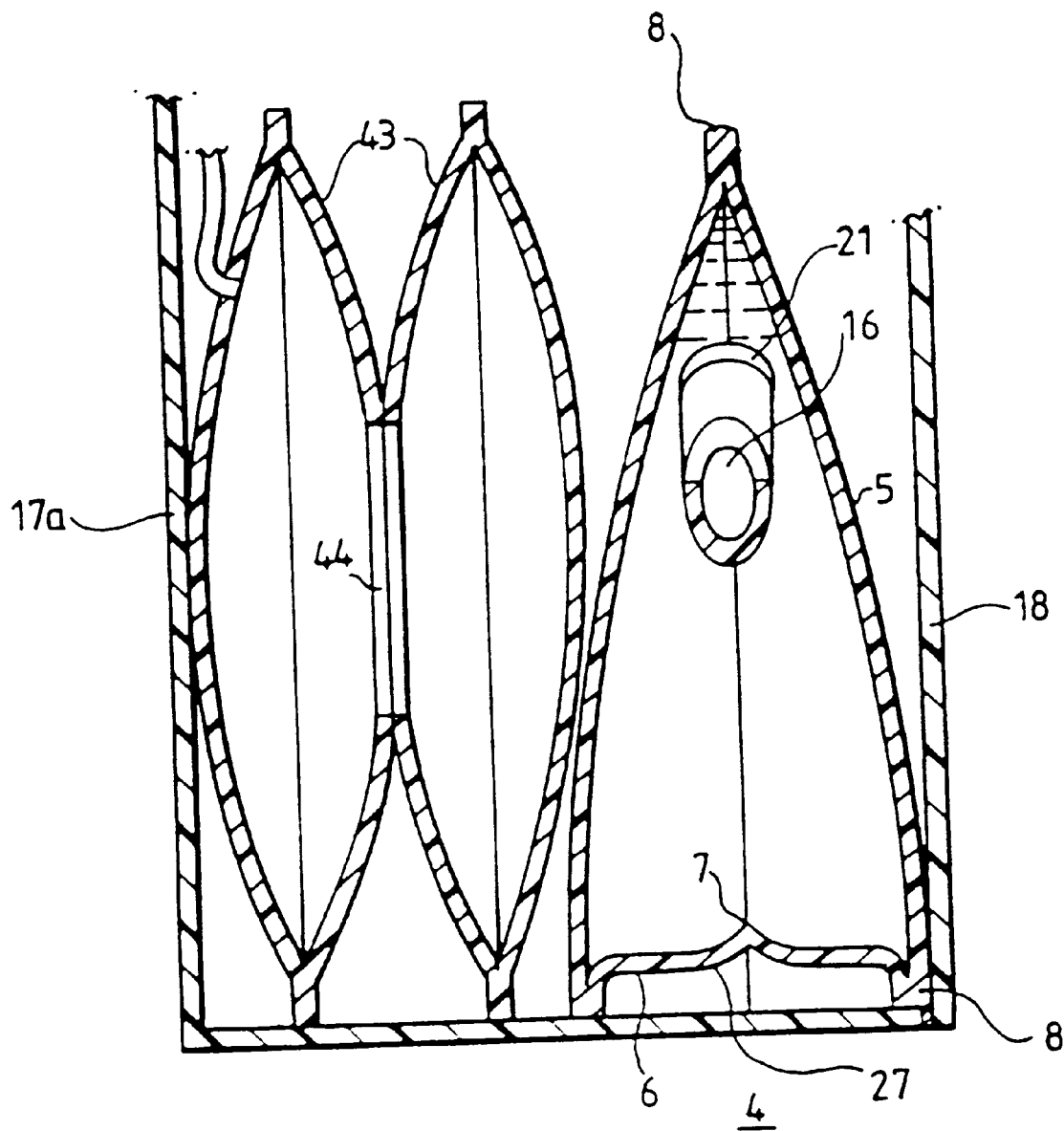
FIG. 2 is a vertical transverse section of the bag and container when filled with paint and taken on the line AA in FIG. 1 before any compression of the container.
Figure 3:
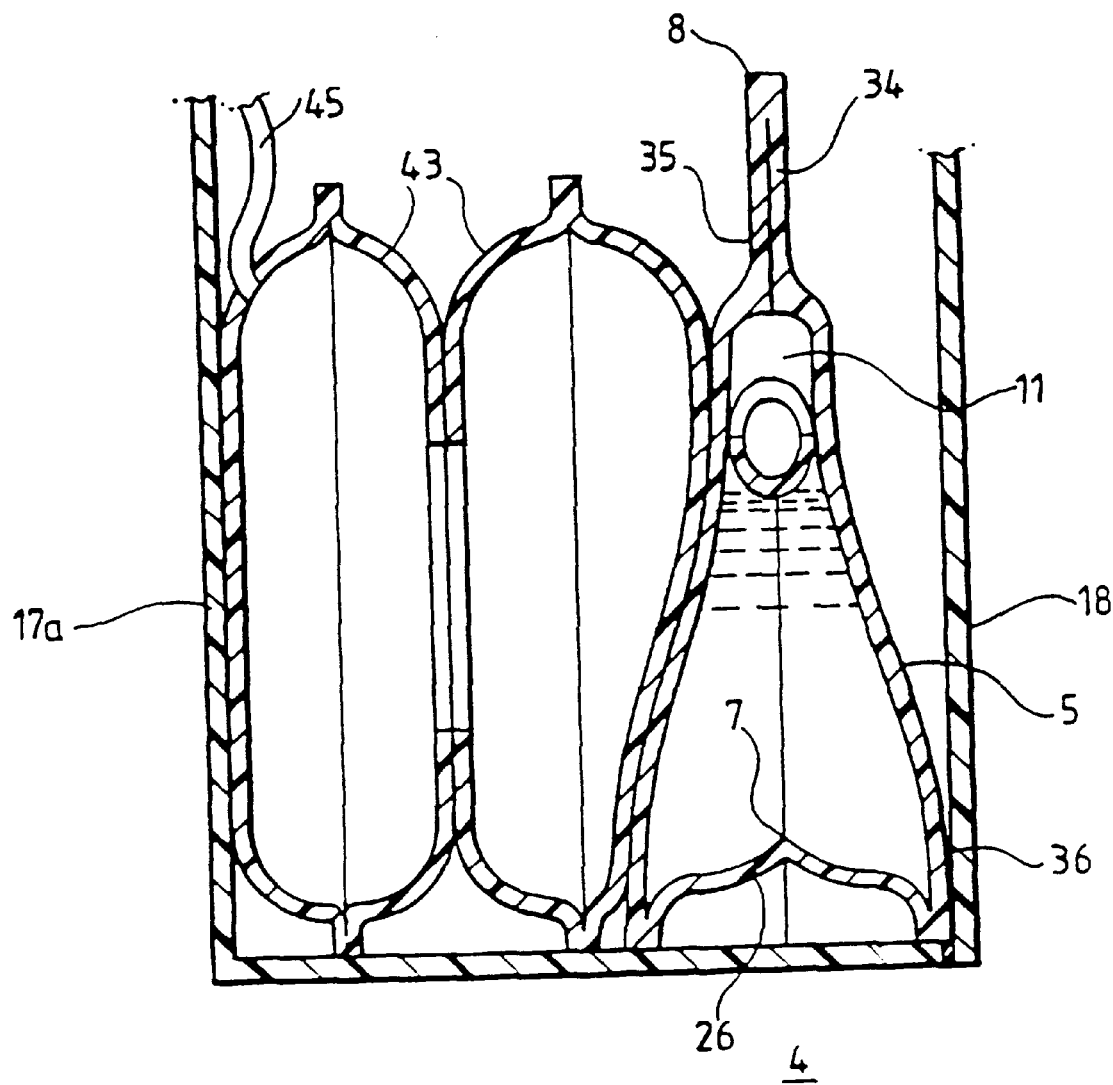
FIG. 3 shows the section of FIG. 2 as it becomes when the bag is partial inflated and the container is partially empty.
Figure 4:
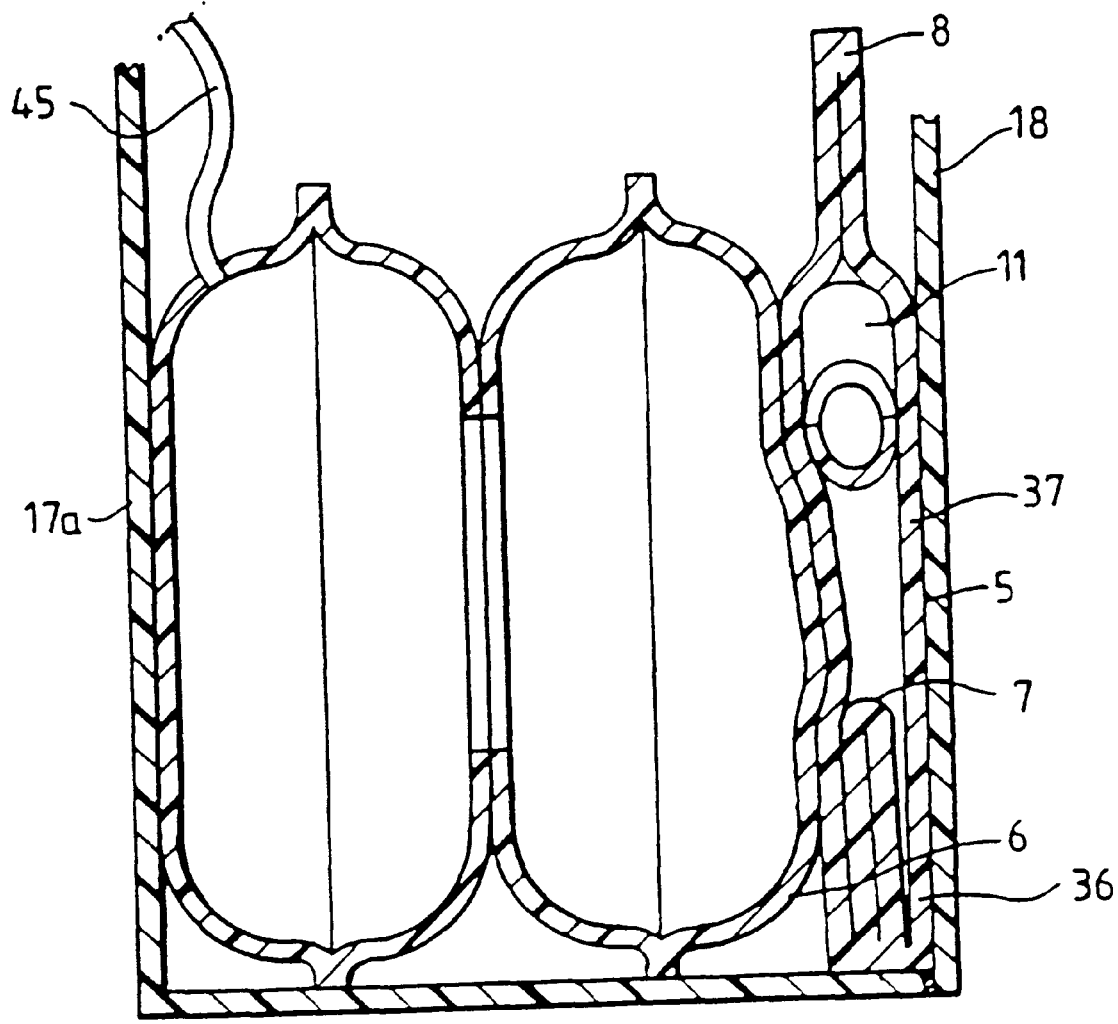
FIG. 4 shows the section of FIG. 2 as it becomes when the bag is completely inflated and the container is empty.

The mode of inflation of bag 43 and of the collapsing of container 4 when subjected to transverse compression is shown in FIGS. 2 to 4. FIG. 2 shows bag lightly inflated and container 4 when completely filled with paint 2. Flexible walls 5 are fully spaced apart and base 6 is essentially fully extended showing only a slight degree of shedding 33 extending down either side of crease 7. In this condition, container 4 is easily able to stand upright on a shelf in a shop or store resting on heat-sealed margins 8.

On exerting a transverse horizontal compression on walls 5, base 6 begins to fold upwardly about its crease 7 and container 4 begins to collapse in a pre-determined and therefore regulated way from the top downwards passing through intermediate positions such as that shown in FIG. 3 until it reaches an essentially fully collapsed state as shown in FIG. 4 where virtually all of paint 2 has been expelled. FIG. 3 shows how the top regions 34 of opposed walls 5 come together and sealingly contact each other along line 35. FIG. 3 also shows how collapsed walls 5 engulf channel-defining spacer 11 whereas lower regions 36 of walls 5 hardly come together at all as is evidenced by the fact that shedding 27 about crease 7 shows only a slight increase. Accordingly, paint 2 would be trapped in a compartment in the lower part of container 4 were it not for the channel defined by spacer 11.

In FIG. 4, bag 43 is highly inflated and container 4 is essentially fully collapsed and base 6 is fully folded about its crease 7 and engulfed by closely opposed lower regions 3 of walls 5. The ability of base 6 to fold about its crease 7 is essential to enabling self-standing container 4 when filled with verse dense coating composition to be compressible bad pressure generated by a battery of only 3.5 v.

Figure 5:
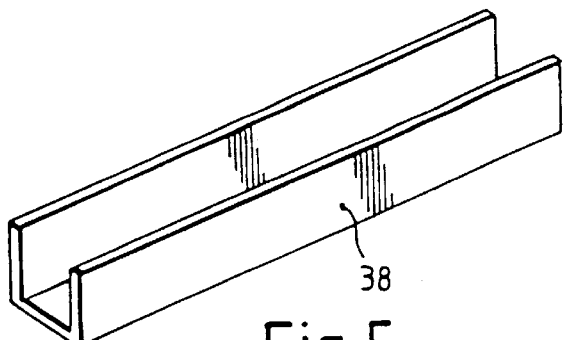
FIG. 5 is a perspective view on a large scale of an alternative channel-defining spacer.

FIG. 5 shows an alternative channel-defining spacer 38 in the form of a square 'U'-shaped trough.

Figure 6:
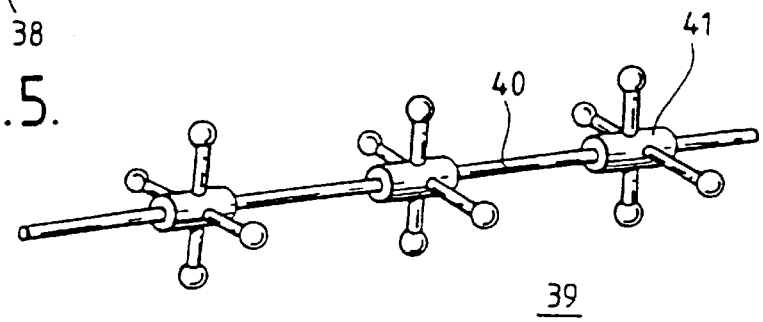
FIG. 6 is a perspective view of a second alternative channel-defining spacer.

FIG. 6 shows a further alternative channel-defining spacer 39 consisting of a spine 40 along which are mounted axially spaced spiders 41 for holding apart collapsed opposed walls 5. Spacer 39 and collapsed walls 5 therefore co-operate to define a channel leading to outlet 9.

Figure 7:
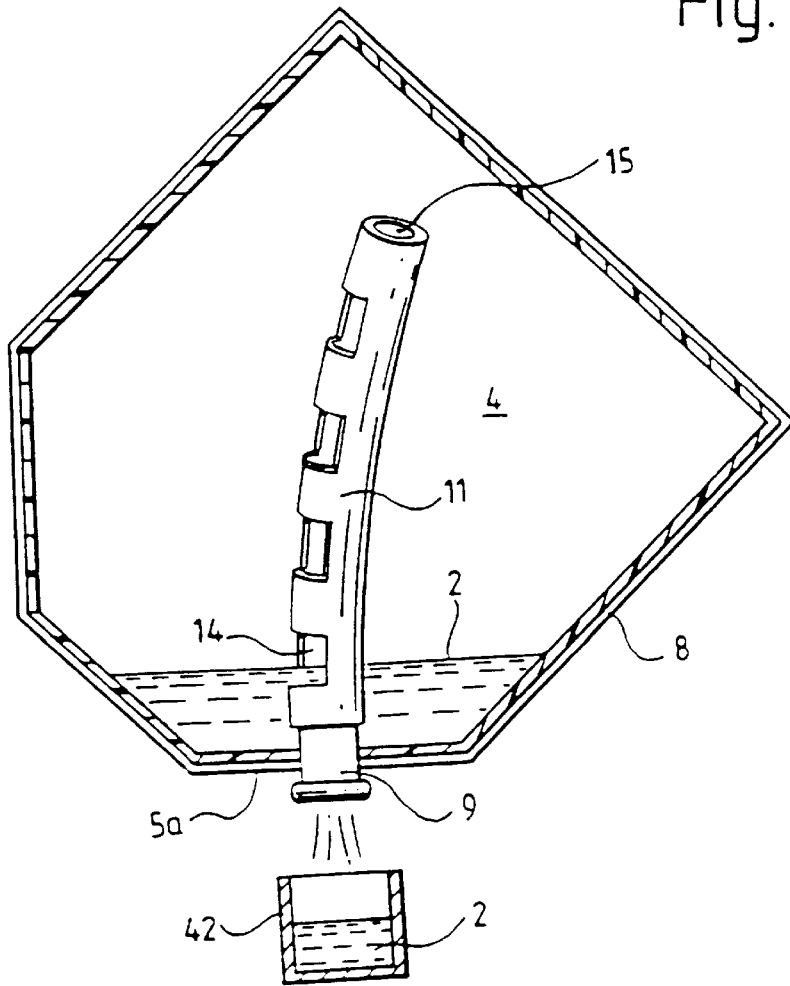
FIG. 7 in a central section of the container shown in FIG. 1 when detached from the combination and inclined to dispense paint by pouring.

FIG. 7 illustrates the way in which paint 2 can be poured from container 4 when it has been detached from the rest of system 1. FIG. 7 shows container 4 when containing only a small residual amount of paint 2 and when it has been partially inverted to an extent of 135°. Residual paint 2 enters via aperture 14 into the proximal end of the channel defined by spacer 11 and then flows out through outlet 9 into a small can 42. Paint 2 in can 42 can then be used to paint any missed patches of a large surface using an ordinary paint brush in the conventional way.

FIG. 7 also shows how chamfer 5a allows paint 2 to be poured from container 4 without the need to invert it totally.

In order to save on assembly costs, the combined outlet 9 and spacer 11 could be provided with one component of a snap-fit sealing means whilst the other component is provided on the hole 5b and chamfered edge 5a of bag 4. The hole 5b could be supplied closed by a plug which can be inexpensively fitted in a factory. The amateur painter would then remove the plug, insert spacer 11 into container 4 and engage the snap-fit sealing components. In this way, the insertion of spacer 11 (which would be expensive to do in a factory) can be done by the ultimate user of the system. Typical snap-fit co-operable components might be a circumferential radially extending rib which makes a push-fit into a circumferential radially extending groove.

We claim:

1. A process for the roller-application of an aqueous coating composition to a surface at ambient temperatures wherein the process includes
   (a) supplying the coating composition in a flexible container (4) having an outlet (9),
   (b) horizontally compressing the container by means of air pressure to expel the coating composition from the container via the outlet,
   (c) transferring the expelled composition via a delivers tube (10) which is 1 to 3 m long onto a roller (3)) and
   d) transferring the composition from the roller onto the surface characterised in that the coating composition is thixotropic and the process also includes
   e) biasing the container to be compressible in a horizontal direction during use by the provision, for the container, of opposed flexible walls (5) spaced apart by a flexible transverse base (6) having a flexible crease (7) which extends between the walls across the width of the container,
   f) using an air-pressure of from 1.8 to 2.3 bar absolute to inflate a flexible bag (43) and urge it horizontally against one of the opposed walls of the container to cause the compression which expels the coating composition and
   g) subjecting the coating composition to the effects of passage through the 1 to 3 m long delivery tube of internal diameter 5 to 15 mm.

2. A process according to claim 1 characterised in that the coating composition has a viscosity and thixotropy at least in part created by a combination of hydrophobic moieties provided by an associative thickener and cellulosic moieties provided by a thickener selected from the group consisting of simple cellulosic moieties provided by a thickener selected from the group consisting of simple cellulosic thickeners, cellulosic associative thickeners and a combination of the two.

3. A process according to claim 1 or claim 2 characterised in that the coating composition has a fixed shear-stress viscosity of from 0.8 to 3.0 pa.sec (8 to 30 poise) when measured at a shear stress of 120 Pascal (1,200 dyne/cm$^2$).

4. A process according to claim 1 characterised in that the coating composition has a fixed shear-rate viscosity of from 0.06 to 0.25 pa.sec (0.6 to 2.5 poise) when measured at a shear-rate of 10,000/sec and a Rotothinner mid-shear viscosity of from 0.5 to 5.0 pa.sec (5 to 50 poise).

5. A process according to claim 1 characterised in that a permanent channel is defined within the container so as to ensure expulsion of the composition when the opposed walls are close together.

6. A combination according to claim 1 characterised in that the combination contains a channel-defining spacer (11) within the container so as to ensure expulsion of the composition when the opposed walls are close together.

7. A process for the roller-, brush- or pad-application of an aqueous coating composition to a surface at ambient temperatures wherein process includes
   a) supplying the coating composition in a flexible container (4) having an outlet (9),
   b) horizontally compressing the container by means of air pressure to expel the coating composition from the container via the outlet,
   c) transferring the expelled composition via a delivery tube (10) 1 to 3 m long onto a roller (3), brush or pad and
   d) transferring the composition from the roller, brush or pad onto the surface
characterised in that the coating composition is thixotropic and the process also includes
   e) biasing the container to be compressible in a horizontal direction during use by the provision, for the container, of opposed flexible walls (5) spaced apart by a flexible transverse base (6) having a flexible crease (7) which extends between the walls across the width of the container, i) using an air-pressure of from 1.8 to 2.3 bar absolute to inflate a flexible bag (43) and urge it horizontally against one of the opposed walls of the container to cause the compression which expels the coating composition and g) subjecting the coating composition to the effects of passage through the 1 to 3 m long delivery tube of internal diameter 5 to 15 mm.

8. An apparatus for use in the roller-, brush- or pad-application of an aqueous coating composition to a surface at ambient temperatures, wherein the apparatus includes:

a) a housing (17) for elements of the apparatus, the housing including opposed walls **(17*a*, 18), b) coating composition (2) supplied in a flexible container (4) having an outlet (9) and located within the housing, c) means for compressing the container horizontally by use of air pressure so as to expel coating composition from the container via the outlet from the container, and d) a delivery tube (10), 1 to 3 m long, one end of which communicates with the outlet from the container and the other end of which is connectable to a roller (3)**, brush or pad adapted to receive a delivery of the composition under pressure characterized in that the coating composition is thixotropic and e) the container includes
   i) opposed flexible walls (5),
   ii) a flexible base (6) which extends transversely of the walls and
   iii) a flexible crease (7) formed in the base which crease extends between the opposed walls across the width of the container and biases the container towards a horizontal compression when in use, f) the means for compressing the container includes a flexible inflatable bag (43) located adjacent one of the opposable walls of the container and adjacent one of the walls of the housing, whereby expansion of the bag by an air pressure of from 1.8 to 2.3 bar urges the bag against the walls to cause horizontal compression of the container, and g) the delivery tube has an internal diameter of 5 to 15 mm.

* * * * *